UNITED STATES PATENT OFFICE 2,226,579

PRODUCTION OF LEATHER

George Robert Pensel, Amsterdam, N. Y.

No Drawing. Application March 31, 1939,
Serial No. 265,142

18 Claims. (Cl. 149—5)

This invention relates to the production of white leather from hides and skins and more particularly to a process for producing leather from skins by subjecting the skins to an aldehyde tannage and then treating the aldehyde tanned skins with aluminum sulfate and a salt of a sulfuric acid ester of an aliphatic alcohol containing from 10 to 18 carbon atoms.

This invention has as an object the manufacture of permanent white tanned leather. A further object is to make white leather which will remain soft even after it has been washed with soap and water or dry cleaned with the ordinary dry cleaning solvents. A still further object is to produce white leather which is free from the objectionable blue color of ordinary chrome and alum tanned white leather and which does not turn yellow upon aging or even when exposed to ultra violet light. Another object is to improve upon the processes described in my prior U. S. Patents Nos. 2,004,472 and 2,004,473 in order to produce an improved quality of leather. Other objects will appear hereinafter.

These objects are accomplished by the following invention according to which leather is produced from skins by tanning the skins with formaldehyde and then treating the formaldehyde tanned skins with aluminum sulfate, a sulfonated oil capable of fat liquoring leather, and a salt of a sulfuric acid ester of an aliphatic alcohol containing from 10 to 18 carbon atoms.

The invention is illustrated but not limited by the following examples.

EXAMPLE I.—*White goat skin sueded leather*

100 pounds of drained skins, which have been previously pickled with acid and salt in the usual manner and have a pH value of 2.0 are placed in a tannery drum, a solution of 10 pounds of anhydrous sodium sulfate, 9 pounds of commercial 60% sodium acetate, and 1 pound 5 ounces of 84% acetic acid in 20 gallons of water at 85° F. are added, and the drum is run for 30 minutes. Then a solution of 3½ pounds of borax and ½ pound of anhydrous sodium sulfate in 5 gallons of water at 85° F. is added to the drum, and the drum is run for 20 minutes. The skins should have a pH value of 4.9 at this time. The excess liquors which remain after these operations are drained off from the drum.

To the skins in the drum there is now added a solution of 2 pounds of anhydrous sodium sulfate, 10 pounds of 40% formaldehyde and 2 pounds of borax in 20 gallons of water at 85° F., and the drum is run for 60 minutes. The skins should have a pH value of 5.5 at this time and withstand immersion in water having a temperature of 197° F. without shrinking. The drum is now run while adding steam slowly at such a rate that the contents of the drum are warmed to 130–135° F. in 60 minutes. The steam is then shut off and the drum is run for another 60 minutes. The skins should have a pH value of about 6.0 at this time. The excess tanning liquor is now drawn off, and the skins are rinsed by running water through the drum while in motion for 30 minutes. The rinse water is then drained off.

To the skins in the drum there is now added a solution of 5 pounds of anhydrous sodium sulfate, 10 pounds of a mixture of 10 parts of potassium aluminum sulfate and 4 parts of sodium lorol sulfate, and 1 pound of a sulfonated mixture of equal parts of cocoanut oil and sperm oil in 20 gallons of water at 90° F. 5 pounds of dry flour is also added to the drum and the drum is now run from 2 to 3 hours. The skins are now removed from the drum and piled evenly on horses. The skins should have a pH value of 4.9 the next morning.

The skins are now returned to the drum, and a solution of 2 pounds of sodium lorol sulfate in 25 gallons of water at 90° F. are added, and the drum is run for 30 minutes. 10 pounds of potassium aluminum sulfate are now dissolved in 12 gallons of water at 85° F., and this solution is added to the drum in 3 parts at 10 minute intervals. The drum is run for 30 minutes after the third addition of this potash alum solution. The skins should have a pH value of 3.7 at this time. A solution of 6 pounds of sodium metasilicate in 8 gallons of water at 85° F. is now prepared and added to the drum in 2 parts at 15 minute intervals. The drum is run 30 minutes after the second addition of the sodium metasilicate solution. The skins should have a pH value of 4.3 at this time. A mixture of 5 pounds of sodium metasilicate, 2 pounds of sodium lorol sulfate, ½ pound of neat's-foot oil, and ½ pound of a sulfonated mixture of equal parts of cocoanut oil and sperm oil in 5 gallons of water at 100° F. is now added and the drum is run for 60 minutes. The skins should have a pH value of 6.7 at this time. A solution of 2 pounds of potassium aluminum sulfate in 3 gallons of water at 85° F. is now added to the drum in two parts at 15 minute intervals, and the drum is run for 30 minutes after the last addition. The skins should have a pH value of 4.7 at this time.

The skins are then removed from the drum and piled evenly on horses where they are permitted to remain overnight. The next morning the skins are hung up to dry. The skins are then dampened and stretched by staking. The leather is then buffed by application to a revolving dry abrasive wheel in the usual manner for suede leather.

The white suede leather obtained in the manner indicated in this example finishes unusually well since no sticky aluminum soaps are left on the leather when the above procedure is followed. The leather which is produced possesses unusual whiteness and it does not turn yellow upon aging or after exposure to ultra violet light. This leather is exceptionally well adapted to be used in the manufacture of shoe uppers. This leather retains its softness even after it has been washed with soap and water or dry cleaned with the ordinary dry cleaning solvents. As far as I am aware white leather which has been made by methods previously known to the industry does not possess such outstanding qualities.

EXAMPLE II.—*White glove leather*

100 pounds of fleshed and degreased skins which have been previously pickled with acid and salt in the usual manner and have a pH value of 2.3 are placed in a tannery drum. A solution of 12 pounds of anhydrous sodium sulfate, 9 pounds of 60% sodium acetate, and 1 pound 5 ounces of 84% acetic acid in 20 gallons of water at 80° F. is then added to the drum, and the drum is run for 45 minutes. The skins should have a pH value of 4.7 at this time. A solution of 3½ pounds of borax in 5 gallons of water at 80° F. is then added to the drum, and the drum is run for another 45 minutes. This treatment with borax should raise the pH value of the skins to 5.0. The liquor resulting from these treatments is now drained from the drum.

A solution of 12 pounds of anhydrous sodium sulfate, 12 pounds of 40% formaldehyde, and 4 pounds of borax in 20 gallons of water at 80° F. is now added to the drum, and the drum is run for 60 minutes. The skins should have a pH value of 6.1 at this time and withstand immersion in water at 192° F. without shrinking. The drum and its contents are heated to 110° F. by adding steam slowly. A solution of 3 pounds of borax and 3 pounds of a sulfonated mixture of equal parts of cocoanut oil and sperm oil in 5 gallons of water at 110° F. is now added to the drum. The drum is then run while adding steam slowly at such a rate that the contents of the drum are warmed to 140° F. in 60 minutes. The pH value of the skins should be 7.2 at this time. The drum is now run for another period of 60 minutes while maintaining the temperature at 140° F. At the end of this time the skins should withstand immersion in water at 198° F. without shrinking. The tanning liquor is now drawn off, and the skins are washed with water having a temperature of 125° F. for 30 minutes. The wash water is then drawn off.

A solution of 12 pounds of a sulfonated mixture of equal parts of cocoanut oil and sperm oil in 20 gallons of water at 125° F. is now added to the skins in the drums, and the drum is run for 60 minutes. A solution of 2 pounds of sodium lorol sulfate in 3 gallons of water at 125° F. is then run into the drum, and the drum is revolved for a further period of 30 minutes. A solution of 2½ pounds of potassium aluminum sulfate in 5 gallons of water at 110° F. is then prepared and added to the drum in three parts at 15 minute intervals. The drum is run continuously while the potash alum solution is being added and is run for 15 minutes after the last feed of the potash alum solution. A solution of 4 ounces of 84% acetic acid in 3 gallons of water is then added to the drum, and the drum is run for a period of 15 minutes. A solution of 1½ pounds of sodium lorol sulfate in 3 gallons of water at 110° F. is then added to the drum, and the drum is revolved for 20 minutes. The skins are now removed from the drum and piled evenly on horses where they are allowed to drain. After draining the skins are hung up to dry and then finished in the usual manner.

The resulting product is an unusually white leather which does not discolor upon aging or exposure to bright sunlight. The resulting leather is soft but not greasy, and it does not lose its soft quality when it is washed with soap and water or treated with the usual dry cleaning solvents. The resulting product is exceptionally suitable for use as glove leather and excels in quality any white leather which has been previously obtained by such known methods of which I am aware.

The leather making process which is described in detail in the preceding examples may be applied to various kinds of skins. The process has been successfully applied in the manufacture of white leather from calf skins, cape skins, elk skins, sheep skins, and buck skins. The white leather so made is used in the manufacture of various leather articles such as gloves, shoes, and badminton birds.

In repickling the skins with sodium acetate and acetic acid and in tanning the skins with formaldehyde, I have substantially followed the procedure which is described and claimed in my prior U. S. Patents Nos. 2,004,472 and 2,004,473. The repickling step and the formaldehyde tanning step which are described in detail in the above examples may be modified in accordance with the optional variations which are described in my prior patents. For a further discussion of these optional variations, the reader is referred to the aforementioned patents.

In the examples above, I have specified the use of potassium aluminum sulfate. In place of potassium aluminum sulfate, I may use other forms of aluminum sulfate such as aluminum sulfate itself, ammonium aluminum sulfate, or sodium aluminum sulfate. I prefer to use an alakli metal aluminum sulfate such as potash alum. When in the claims I mention aluminum sulfate I intend to refer generically to aluminum sulfate itself and its various double salts which are called alums.

The sodium lorol sulfate, which is mentioned in the above examples, is a mixture of the sodium salts of cocoanut oil fatty alcohol sulfates made by catalytically hydrogenating cocoanut oil to produce the corresponding alcohols (known to the trade as Lorol) and sulfating by known methods. Lorol is a mixture of saturated fatty alcohols of from 10 to 18 carbon atoms. The mixture contains about 50% of dodecyl alcohol. In the claims sodium lorol sulfate is desginated as technical lauryl sodium sulfate. In place of sodium lorol sulfate, I may use any salt of a sulfuric acid ester of an aliphatic alcohol containing from 10 to 18 carbon atoms. Some of the suitable alcohol sulfates which may be employed in this process are such saturated alkyl sulfates as dodecyl sulfate, tetradecyl sulfate, cetyl sulfate, and octadecyl sulfate, and such unsaturated alcohol sulfates as palmitoleyl sulfate and oleyl sulfate. Ordinarily it is preferable to use these alcohol sulfates in the form of their sodium salts.

In the above examples I employ a sulfonated mixture of equal parts of cocoanut oil and sperm oil. This is my preferred type of a sulfonated oil which is capable of fat liquoring leather. I may also use other types of sulfonated oils which are capable of fat liquoring leather. I may prepare a suitable sulfonated oil for fat liquoring by sulfating a mixture of cocoanut oil (or any fatty oil) and one or more aliphatic alcohols containing from 10 to 18 carbon atoms such as the mixture of fatty alcohols obtained by catalytically hydrogenating cocoanut oil. Other sulfonated fat liquoring oils which I may employ include sulfonated cod oil, sulfonated neat's-foot oil, sulfonated olive oil, sulfonated castor oil, and sulfonated teaseed oil. However, the sulfonated oils mentioned in the preceding sentence have a fairly high iodine number. Consequently they are readily oxidized by atmospheric oxygen, and leather which has been fat liquored by means of these latter sulfonated oils will not stay permanently white. Of course if the tanner wishes to make a dyed leather of this type instead of a permanently white leather the use of these latter sulfonated oils is not objectionable. Where a permanently white leather is desired the use of a sulfonated mixture of sperm oil and cocoanut oil is preferred.

The complete theory of the present invention is not thoroughly understood, and hence it is to be understood that the following explanations of what occurs in the processes set forth in the above examples may not be completely accurate. Nevertheless, it is believed that the following explanations will enable the reader to obtain a fuller understanding of the present invention.

On referring to Example I it will be noted that after the skins have been formaldehyde tanned and rinsed they are treated with a solution containing potassium aluminum sulfate, sodium lorol sulfate, and a sulfonated mixture of equal parts of cocoanut oil and sperm oil. The potassium aluminum sulfate reacts with the sodium lorol sulfate and the sulfonated mixture of oils to form the insoluble aluminum compounds thereof. If sodium lorol sulfate were absent from this treating solution, the potassium aluminum sulfate would react with the sulfonated mixture of oils to form sticky aluminum compounds of these sulfonated oils. Due to the presence of sodium lorol sulfate in this treating solution the potassium aluminum sulfate reacts with the sulfonated mixture of oils to form dry non-tacky aluminum compounds of these sulfonated oils. In the production of suede leather it is important to prevent the formation of sticky aluminum compounds of these sulfonated oils because it is impossible to buff a skin for suedes when sticky aluminum compounds are present due to glazing on the wheel. The effect of this treating solution is similar to that of egg yolk which is quite generally used in fat liquoring alum tanned white leather. This treating solution is superior to egg yolk since egg yolk turns yellow with age and has a yellow color which is objectionable. Furthermore, alum is easily washed out of a skin which has been fat liquored with egg yolk. The sodium lorol sulfate has a softening effect on leather similar to that of a fat liquor, and therefore it is only necessary to use small quantities of sulfonated oils that are capable of fat liquoring leather. The use of sodium lorol sulfate reduces the amount of fat liquor from that which otherwise would be required if sodium lorol sulfate were not used. According to the process described above the potassium aluminum sulfate reacts with the sodium lorol sulfate and the sulfonated mixture of equal parts of cocoanut oil and sperm oil to form precipitates of the insoluble aluminum compounds of lorol sulfate and of the sulfonated mixture of oils within the body of the leather itself. The fact that the aluminum is precipitated along with the lorol sulfate and the sulfonated mixture of oils into the body of the leather itself probably accounts for the fact that leathers of greater stability toward washing and dry cleaning are obtained by the processes of the present invention. Since the lorol sulfate and the sulfonated mixture of oils are fixed in the leather as insoluble aluminum compounds, it is impossible to remove the fat liquor from the leather by washing with soap and water. Ordinary dry cleaning solvents do not affect leather made according to the process of this invention by extracting the fat liquor and oils therefrom since the lorol sulfate and sulfonated mixture of oils are fixed in the leather as insoluble aluminum compounds. The insoluble aluminum salt of lorol sulfate remains in the leather after washing and dry cleaning and maintains the original soft handle and finish. Dry cleaning with organic solvents actually improves this leather since a rounder and softer feel is imparted to the leather by removal of the fats which are not combined with the aluminum.

It is essential to use sodium lorol sulfate in conjunction with aluminum sulfate after an aldehyde tannage to obtain leather having the requisite character, strength, stability and filling qualities. Care must be taken to eliminate excess acid during the treatment of the leather with potassium aluminum sulfate and sodium lorol sulfate so that the leather will be strong and stable. In the process set forth in Example I sodium metasilicate is employed to reduce the acidity in the final treatment bath. The use of sodium metasilicate in conjunction with potash alum increases the roundness or plumpness of the leather. If additional roundness is not desired the acidity of the final treatment bath may be reduced with borax or some similar alkaline reagent. The addition of sodium lorol sulfate to the bath along with the neat's-foot oil and the sulfonated mixture of cocoanut oil and sperm oil enables the latter fat liquoring oils to thoroughly penetrate the leather. The potassium aluminum sulfate again reacts with the sodium lorol sulfate and the sulfonated mixture of cocoanut oil and sperm oil to precipitate the insoluble aluminum compounds of lorol sulfate and of the sulfonated mixture of oils within the body of the leather. By the end of this treatment the pH of the treating bath has attained the value of 6.7. Since leather produced at this pH is unsatisfactory in plumpness, it is necessary to make the final addition of potassium aluminum sulfate to this treatment bath to reduce the pH thereof to approximately 4.7 in order to obtain leather having maximum roundness. This last addition of potash alum to the treatment bath is also necessary in order to be certain that all of the lorol sulfate and the sulfonated mixture of cocoanut oil and sperm oil are completely precipitated and fixed in the leather in the form of insoluble aluminum compounds.

The white leather produced according to the process described in Example I is a very soft, full, and pliable leather. It will not yellow on aging or even on exposure to ultra violet light. This leather is not only white on the surface but is also white in the interior as can be seen by looking at a cut edge of the leather. This leather is free from the objectionable blue color of ordinary alum and chrome tanned white leather.

On referring to Example II it will be noted that after the skins have been formaldehyde tanned they are treated with a sulfonated mixture of equal parts of cocoanut oil and sperm oil, sodium lorol sulfate, and potassium aluminum sulfate. The purpose of treating the tanned leather with these substances will probably be evident from the discussion of Example I which has been given above. The sulfonated mixture of oils and the sodium lorol sulfate is exhausted into the leather and fixed therein in the form of insoluble aluminum compounds by adding potash alum gradually to the treating bath in order to precipitate both the sulfonated mixture of oils and the lorol sulfate into the leather in the form of nontacky aluminum compounds, which are retained by the leather. The resulting white leather can be washed with soap and water at 90°–100° F. without affecting its softness. The resulting leather stays soft when it is dry cleaned with the ordinary dry cleaning solvents, since these solvents do not remove the precipitated aluminum compounds of the sulfonated mixture of cocoanut oil and sperm oil and lorol sulfate from the leather. The leather is soft without fat being in evidence, and the stability of the tannage is much better than that of the ordinary alum tanned white leather.

The above description and examples are to be taken as illustrative only and not to limit the scope of the invention. Any variation or departure therefrom which conforms to the spirit of the invention and comes within the scope of the claims is to be regarded as an embodiment of this invention.

I claim:

1. A process for producing leather from skins which comprises subjecting the skins to an aldehyde tannage and then treating the aldehyde tanned skins with aluminum sulfate and a salt of a sulfuric acid ester of an aliphatic alcohol containing from 10 to 18 carbon atoms.

2. A process for producing leather from skins which comprises tanning the skins with formaldehyde and then treating the formaldehyde tanned skins with aluminum sulfate, a sulfonated oil capable of fat liquoring leather, and a salt of a sulfuric acid ester of an aliphatic alcohol containing from 10 to 18 carbon atoms.

3. A process for producing leather from skins which have been pickled in a strong inorganic acid which comprises treating the pickled skins with a soluble salt of a soluble organic acid prior to tanning, tanning the skins with formaldehyde and then treating the formaldehyde tanned skins with aluminum sulfate, a sulfonated oil capable of fat liquoring leather, and a salt of a sulfuric acid ester of an aliphatic alcohol containing from 10 to 18 carbon atoms.

4. A process for producing leather from skins which have been pickled in a strong inorganic acid which comprises repickling said skins by agitating them in a drum containing an aqueous solution of sodium acetate prior to tanning, tanning the repickled skins with formaldehyde in the presence of sodium sulfate and borax, and then treating the formaldehyde tanned skins with aluminum sulfate, a sulfonated mixture of sperm and cocoanut oils, and a sodium alkyl sulfate containing from 10 to 18 carbon atoms in the alkyl radical.

5. A process for producing leather from skins which have been pickled in a strong inorganic acid which comprises repickling said skins by agitating them in a drum containing an aqueous solution of sodium acetate, sodium sulfate, and acetic acid; adding borax to the solution and subjecting the skins to further agitation in the drum; draining off the repickling liquor; tanning the repickled skins with an aqueous solution of formaldehyde containing borax and sodium sulfate; draining off the tanning liquor; and then treating the formaldehyde tanned skins with potassium aluminum sulfate, a sulfonated mixture of equal parts of sperm and cocoanut oils and technical lauryl sodium sulfate by agitating the tanned skins in an aqueous solution to which these substances are added.

6. A process for producing leather from skins which comprises tanning the skins with formaldehyde and then treating the formaldehyde tanned skins with flour, aluminum sulfate and a salt of a sulfuric acid ester of an aliphatic alcohol containing from 10 to 18 carbon atoms.

7. A process for producing leather from skins which comprises tanning the skins with an aqueous solution of formaldehyde, draining off the tanning liquor, treating the tanned skins with an aqueous solution containing potassium aluminum sulfate and technical lauryl sodium sulfate, removing the tanned skins from this treating solution, and then further treating the tanned skins by agitating them in an aqueous bath to which technical lauryl sodium sulfate and potassium aluminum sulfate are added alternately.

8. A process for producing leather from skins which comprises tanning the skins with formaldehyde, treating the formaldehyde tanned skins with aluminum sulfate and a salt of a sulfuric acid ester of an aliphatic alcohol containing from 10 to 18 carbon atoms, and then further treating the tanned skins by agitating them in an aqueous bath to which a salt of a sulfuric acid ester of an aliphatic alcohol containing from 10 to 18 carbon atoms and aluminum sulfate are added alternately.

9. A process for producing leather from skins which comprises tanning the skins with formaldehyde, treating the formaldehyde tanned skins with aluminum sulfate and a sodium alkyl sulfate containing from 10 to 18 carbon atoms in the alkyl group, and then treating the leather with sodium metasilicate.

10. A process for producing leather from skins which have been pickled in a strong inorganic acid which comprises treating the pickled skins with a soluble salt of a soluble organic acid prior to tanning, tanning the skins with formaldehyde, and treating the formaldehyde tanned skins with flour, aluminum sulfate, a sulfonated oil capable of fat liquoring leather, and a sodium alkyl sulfate containing from 10 to 18 carbon atoms in the alkyl group.

11. A process as set forth in claim 10 wherein the steps recited in claim 10 are followed by further treatments of the leather with a sodium alkyl sulfate containing from 10 to 18 carbon atoms in the alkyl group, aluminum sulfate, and sodium metasilicate.

12. A process of producting white leather from skins that have been pickled in a strong inorganic acid which comprises repickling said skins by agitating them in a drum containing an aqueous solution of sodium acetate, sodium sulfate, and acetic acid; adding borax to the solution and subjecting the skins to further agitation in the drum;

draining off the repickling liquor; tanning the repickled skins with an aqueous solution of formaldehyde containing borax and sodium sulfate; draining off the tanning liquor; treating the formaldehyde tanned skins with an aqueous solution containing sodium sulfate, potassium aluminum sulfate, technical lauryl sodium sulfate, a sulfonated mixture of equal parts of sperm and cocoanut oils, and flour; removing the skins from this treating solution; and then agitating the tanned skins in an aqueous solution of technical lauryl sodium sulfate to which there is added successively: (1) a solution of potassium aluminum sulfate, (2) a solution of sodium metasilicate, (3) a solution containing sodium metasilicate, technical lauryl sodium sulfate, neat's-foot oil, and a sulfonated mixture of equal parts of sperm and cocoanut oils, and (4) a solution of potassium aluminum sulfate.

13. A process for producing leather from skins which comprises tanning the skins with formaldehyde; treating the formaldehyde tanned skins with aluminum sulfate, a sulfonated oil capable of fat liquoring leather, and a salt of a sulfuric acid ester of an aliphatic alcohol containing from 10 to 18 carbon atoms; and then treating the leather with a solution of a salt of a sulfuric acid ester of an aliphatic alcohol containing from 10 to 18 carbon atoms to which there is added successively: (1) aluminum sulfate, (2) sodium metasilicate, and (3) aluminum sulfate.

14. A process for producing leather from skins which comprises tanning the skins with formaldehyde; agitating the formaldehyde tanned skins in an aqueous solution containing aluminum sulfate, a sulfonated oil capable of fat liquoring leather, a sodium alkyl sulfate containing from 10 to 18 carbon atoms in the alkyl radical; and then treating the leather with a solution of a sodium alkyl sulfate containing from 10 to 18 carbon atoms in the alkyl radical to which there is added successively: (1) a solution of aluminum sulfate, (2) a solution of sodium metasilicate, (3) a solution containing sodium metasilicate, a sodium alkyl sulfate containing from 10 to 18 carbon atoms in the alkyl radical, and a sulfonated oil capable of fat liquoring leather, and (4) a solution of aluminum sulfate.

15. A process for producing leather from skins which comprises tanning the skins with formaldehyde and then treating the formaldehyde tanned skins with a solution of a sulfonated oil capable of fat liquoring leather to which there is added consecutively: (1) a sodium alkyl sulfate containing from 10 to 18 carbon atoms in the alkyl radical, (2) aluminum sulfate, and (3) a sodium alkyl sulfate containing from 10 to 18 carbon atoms in the alkyl radical.

16. A process for producing leather from skins which have been pickled in a strong inorganic acid which comprises treating the pickled skins with a soluble salt of a soluble organic acid prior to tanning; tanning the skins with formaldehyde in the presence of borax and a sulfonated oil capable of fat liquoring leather; and then treating the formaldehyde tanned skins with a solution of a sulfonated oil capable of fat liquoring leather to which there is added consecutively: (1) a sodium alkyl sulfate containing from 10 to 18 carbon atoms in the alkyl radical, (2) potassium aluminum sulfate, and (3) a sodium alkyl sulfate containing from 10 to 18 carbon atoms in the alkyl radical.

17. A process for producing leather from skins which comprises tanning the skins with an aqueous solution of formaldehyde which contains sodium sulfate, borax, and a sulfonated mixture of sperm and cocoanut oils; removing the tanning liquor from the skins; and then agitating the formaldehyde tanned skins in an aqueous solution of a sulfonated mixture of sperm and cocoanut oils to which there is added consecutively: (1) a solution of technical lauryl sodium sulfate, (2) a solution of potassium aluminum sulfate, and (3) a solution of technical lauryl sodium sulfate.

18. A process of producing white leather from skins which have been pickled in a strong inorganic acid which comprises repickling said skins by agitating them in a drum containing an aqueous solution of sodium acetate, sodium sulfate, and acetic acid; adding borax to the solution and subjecting the skins to further agitation in the drum; draining off the repickling liquor; tanning the repickled skins with an aqueous solution of formaldehyde containing borax, sodium sulfate, and a sulfonated mixture of equal parts of sperm and cocoanut oils; draining off the tanning liquor; and then agitating the formaldehyde tanned skins in an aqueous solution of a sulfonated mixture of equal parts of sperm and cocoanut oils to which there is added consecutively: (1) a solution of technical lauryl sodium sulfate, (2) a solution of potash alum, and (3) a solution of technical lauryl sodium sulfate.

GEORGE R. PENSEL.